United States Patent [19]

Carter et al.

[11] Patent Number: 4,588,985
[45] Date of Patent: May 13, 1986

[54] POLYNOMIAL HASHING

[75] Inventors: John L. Carter, Putnam Valley; Mark N. Wegman, New York, both of N.Y.

[73] Assignee: International Business Machines Corporation, Armonk, N.Y.

[21] Appl. No.: 567,199

[22] Filed: Dec. 30, 1983

[51] Int. Cl.$^4$ .............................................. H03M 7/00
[52] U.S. Cl. ............................................. 340/347 DD
[58] Field of Search .............................. 340/347 DD

[56] References Cited

U.S. PATENT DOCUMENTS 4,295,124  10/1981  Roybal ........................ 340/347 DD

OTHER PUBLICATIONS

New Hash Functions and Their Use in Authentication and Set Equality, by Mark N. Wegman and J. Lawrence Carter, Journal of Computer and System Sciences, vol. 22, No. 3, Jun. 1981.
Universal Classes of Hash Functions, by J. Lawrence Carter and Mark N. Wegman, Journal of Computer and System Sciences, vol. 18, No. 2, Apr. 1979.

Primary Examiner—Bernard Roskoski
Attorney, Agent, or Firm—Sughrue, Mion, Zinn, Macpeak and Seas

[57] ABSTRACT

Elements x in a domain A are hashed into a range B by selecting any one of a plurality of hashing functions which collectively form an almost universal$_2$ class of functions. The data element to be hashed is separated into individual sub-strings $x_1$ through $x_n$ of no more than log$_2$(b) bits in length, where b is an integer, and the hashing algorithm is a polynomial of the form $f_y(x) = (y^0 x_1 + y^1 x_2 + \ldots + y^{n-1} x_n)$ (mod b). In general, for a finite field of $b = p^k$ elements, where k is a positive integer, there will be a hash function defined by the formula $f_y(x) = y^0 x_1 + y^1 x_2 + \ldots + y^{n-1} x_n$, where the addition and multiplication operations are those defined by the finite field and y is an element of the field. In a second embodiment, the hashing is a two-stage process defined by $g_z(f_y(x))$, where $f_y(x)$ is defined as above and $g_z$ is a function selected from a known universal$_2$ class of hash functions.

23 Claims, 1 Drawing Figure

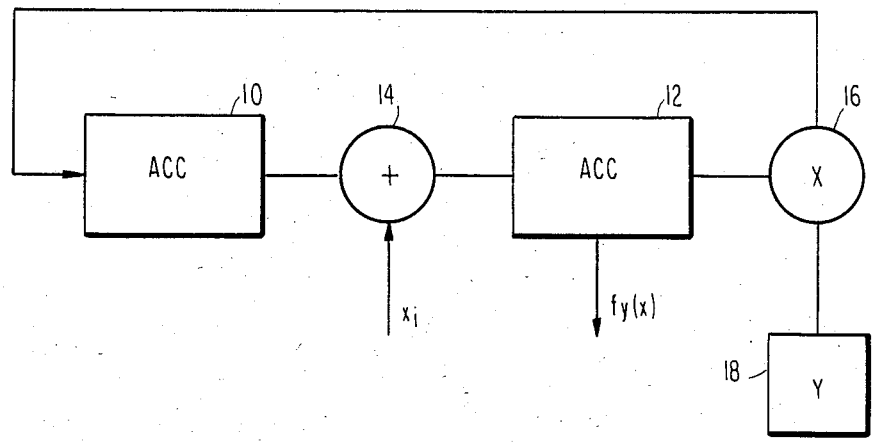

POLYNOMIAL HASHING

BACKGROUND OF THE INVENTION

This invention is directed to a novel hashing technique, i.e., a technique for mapping from a larger domain to a smaller range. The invention is more particularly directed to a hashing technique which requires a relatively small number of hashing functions to map data from a domain A to a range B while minimizing the probability of two different data points in A being mapped to the same point in B.

The concept of hashing is well-known and is employed in a variety of applications where it is necessary to map a large set of data points into a smaller set of data points. The invention will be described primarily in the context of data storage and retrieval, although it should be remembered that hashing in general, and the invention in particular, have many other useful applications.

In one example of the use of hashing, there may be a large memory and a smaller cache, and it may be desirable to selectively store the contents of certain memory addresses in the cache. When storing data in the cache, a hashing function may be used to generate a cache address at which the data is to be stored. For example, if the cache has a storage capacity of 256 words and the larger memory stores 4,096 words, the addresses in the cache can be specified with 8 bits of address while the addresses in the larger memory can be specified with 12 bits of address. One simple type of hashing function would be to use the first 8 bits of the larger memory address as the address in the cache. In this case, there will be sixteen addresses in the larger memory capable of being mapped to any given address in the cache. If an address from the memory is hashed to an address which is already occupied, some additional steps must be taken in an attempt to find a vacant storage location in the cache. It would be desirable to have a hashing function which would minimize such "collisions".

If the selection of data from the larger memory is random, and the number of elements already placed in the cache is significantly smaller than the size of the cache, then the probability of a new memory address colliding with a previous address is relatively small. In many cases, however, data selection is not random but instead consecutive address from the larger memory may often be selected. Since there is a relatively high probability that consecutive addresses in the larger memory will have the same hashing address in the above example, the frequency of collisions would be unacceptable.

Substantial efforts have been made to provide hashing techniques which will maintain a relatively low probability of collision regardless of the input distribution. In our paper entitled "Universal Classes of Hash Functions", *Journal of Computer and System Sciences*, Vol. 18, No. 2, April 1979, pages 143-154, we have proposed an approach wherein a set of hash functions are provided instead of just one. A hash function is selected from the hash function set each time an application is run, or less frequently if desired. If the set of hash functions is carefully chosen to be a universal$_2$ class, good performance can be obtained regardless of the input distribution. The term "universal$_2$" is explained in detail in the above-referenced paper. Briefly, a set of hash functions will be considered universal$_2$ if the probability of any two data points colliding is less than or equal to 1/b, where b is the size of range B. In other words, no pair of data points will collide under more than 1/b of the hash functions in the set.

A problem with the hashing technique described above is that known universal$_2$ classes typically contain a fairly large number of hash functions. For instance, a universal$_2$ class capable of hashing n-bit long names will typically contain $2^{O(n)}$ functions, and O(n) bits are therefore required to specify the selected hashing functions, where O(n) in general designates a linear function of n. In some instances, e.g., when using hashing to generate authentication tags, the system becomes impractical if a large number of bits are required to specify the hashing function.

In our subsequent paper entitled "New Hash Functions and Their Use in Authentication and Set Equality", *Journal of Computer and System Sciences*, Vol. 22, No. 3, June 1981, pages 265-279, we have proposed a set of hashing functions which is "almost" strongly universal$_2$ and is much smaller, such that only m·log(n) bits are required to specify the chosen hashing function, where m is the length of the output. While this improvement can make some applications of hashing practical, it would be desirable to provide an even smaller class of hashing functions which will achieve satisfactory results. It is sometimes necessary to hash data strings which are long enough that even m·log(n) can be an excessively large number.

SUMMARY OF THE INVENTION

It is therefore an object of the present invention to provide an almost universal$_2$ class of hash functions which is far smaller than any previously known such class, thereby permitting the hashing of very long strings without requiring a large hashing program and while still holding the probability of collision to a minimum.

Briefly, this and other objects of the invention are achieved by a polynomial hashing technique. To hash an element x from the domain A to the range B, x will be represented by its base 2 representation and will then be broken into substrings $x_1, x_2 \ldots, x_n$ which are each k or fewer bits long, where k is the largest integer less than or equal to $\log_2(b)$, and b is the size of the range B. Considering first the case where b is a prime number, the class H of hashing functions will comprise $f_0, f_1 \ldots, f_{b-1}$, and any particular hashing function $f_y$ will be given by $f_y(x) = (y^0 x_1 + y^1 x_2 + \ldots + y^{n-1} x_n)$ (mod b). For any distinct x and x', there will be no more than n−1 y's such that $f_y(x) = f_y(x')$. Thus, the chance of two elements x and x' colliding will be (n−1)/b. Another variant is to consider the operations to be performed using finite field arithmetic. Specifically, given any prime p and any positive integer k, there is a finite field with $p^k$ elements. Now, for each y in the field, there wll be a hash function defined by the formula $f_y(x) = y^0 x_1 + y^1 x_2 + y^2 x_3 + \ldots + y^{n-1} x_n$, where the operations are those given by the finite field operations. k=1 and $b = p^k$ would then be a special case of this broader concept.

If it is desirable to have a smaller chance of collision or to avoid the limitation that b be a prime number, a class H' of hash functions may be provided wherein each function defines a twostage process. The functions in H' will be indexed by two numbers y and z, and the value of a particular member of H' applied to an element x will be equal to $g_z(f_y(x))$. In this case, the range of $f_y$ is increased to $0, 1, \ldots, p-1$, where p is a prime number larger than b, and $f_y(x)$ is computed as described above. For larger values of p, the chance of collision will be decreased. The second part of the hash function $g_z$ is simply chosen from a universal$_2$ class of hash functions having a range of b. The chance of any two elements colliding is no more than $(1/b)+((n-1)/p)$. As p increases, the chance of two elements colliding approaches $1/b$.

BRIEF DESCRIPTION OF THE DRAWINGS

The invention will be more clearly understood from the following description in conjunction with the accompanying drawing, wherein the single feature is a brief diagram of the essential components of arithmetic circuitry which may be used to implement the hashing technique according to the present invention.

DETAILED DESCRIPTION OF THE PREFERRED EMBODIMENTS

The invention will be described in the context of mapping from a domain A to a range B. For the description of the first embodiment, it will be assumed that the size b of the range B is a prime number. In this case, the class H of hash functions will consist of b functions $f_0, f_1, \ldots, f_{b-1}$. To hash an element x from the domain A to the range B using a particular hashing function $f_y$ from the class H, the element x will be represented in its base 2 representation and will be broken up into sub-strings $x_1, x_2, \ldots, x_n$ which are each k or fewer bits long, where k is equal to the largest integer less than or equal to $\log_2(b)$. The hashed address in B will then be given by:

$$f_y(x)=(y^0x_1+y^1x_2+\ldots+y^{n-1}x_n) \pmod{b}.$$

By way of example, consider the case of a domain A of 64K (i.e., 65,536) words and a range B of b=101 memory locations. H will consist of functions $f_0$ through $f_{100}$, and K, the largest integer less than or equal to $\log_2(b)$, is equal to 6. For an element x in A represented by its base 2 representation, e.g., 0111001111000101, x could be broken up into three sub-strings of up to six bits each, i.e., $x_1=011100=28$, $x_2=111100=60$, $x_3=0101=5$. It would also be possible to divide a 16-bit word into four 4-bit strings or some other combination of data strings, as long as consistency is maintained. Choosing, e.g., $f_y=f_2$ from the class H, the hashed address would be given by $f_y(x)=((1)(28)+(2)(60)+(4)(5)) \pmod{101}=7$. If a different function $f_y=f_5$ were chosen, the hashed address would be given by $f_5(x)=((1)(28)+(5)(60)+(25)(5)) \pmod{101}=49$.

It may be desirable, as is well known in the art, to include in the data stream an indication of the length of the message to be hashed, but this does not constitute a part of the present invention and is not necessary for an understanding thereof, and will not be described in detail here.

One can show that, for any distinct x and x', there are no more than n−1 y's such that $f_y(x)=f_y(x')$. Thus, the chance of two elements x and x' colliding is $(n-1)/b$. The number of hashing functions used in the present invention is b. The number of hashing functions required is therefore independent of the number of elements in A. Thus, the hashing technique according to the present invention is especially useful in hashing long strings of data without requiring an excessively large set of hashing functions to do so.

An additional advantage is that it is unnecessary to know the size of A in order to determine the hashing functions, so that the same functions can be used with substantially equal efficiency on data strings of different sizes.

If it is desirable to have a smaller chance of collision or to utilize a range where b is not a prime number, a two-stage process may be used to create the hashing functions in a class H'. The functions in H' will now be indexed by two numbers y and z, and the value of a particular member of H' applied to an element x will be equal to $g_z(f_y(x))$. In other words, a first function $f_y(x)$ will be used to map the data elements from the domain A to a range P', and a second function $g_z$ will be used to map the resulting elements from P' to B.

The functions $f_y$ and $g_z$ will now be described in more detail. As described above, the hashing will be accomplished in two stages, a first stage involving the hashing of elements from a domain A to a range P', and a second stage involving the hashing of elements from P' to a range B. The size of P is chosen to be a prime number p which is larger than the size b of the range of H'. The first stage of the hashing function $f_y(x)$ is computed as described above, except that the range of $f_y$ is now $(0, 1, \ldots, p-1)$. The polynomial hashing function of the form $f_y(x)=(y^0x_1+y^1x_2+\ldots+y^{n-1}x_n) \pmod{p}$ will hash the elements x in A into the range P in the same manner as discussed above, with the chance of any two elements x and x' colliding being $(n-1)/p$. As p becomes larger, it will be easily seen that the probability of collision is reduced.

The second stage of the hashing process, $g_z$, is simply chosen from a universal$_2$ class of hash functions, e.g., one described in the above-cited paper entitled "Universal Classes of Hash Functions" whose range has a size b. Since the class of functions from which $g_z$ is selected is truly universal$_2$, the probability of collision during the second stage of the hashing process is at most $1/b$, and the chance of any two elements colliding during the mapping from A to B is no more than $(1/b)+((n-1)/p)$. Thus, as p increases, the probability of any two elements colliding approaches $1/b$.

With this latter technique, polynomial hashing is only used in the first stage, so that the size b of the final range B need not be a prime number. The size p of the intermediate range P must be a prime number, but the range of the polynomial hashing is no longer determined by the size of the memory into which the data elements are to be hashed, so that p is free to be increased to a much higher value, thereby decreasing the probability of collision.

In either of the above techniques, the probability of collision is maintained at a very low level without requiring an excessively large set of functions. This makes it possible to hash very long data strings without requiring a large hashing program, and nevertheless it will be unlikely that an unusually large number of collisions will occur even if the strings being hashed are quite similar.

Once given the description above, it will be a very straightforward matter for one of ordinary skill in the art to design the simple arithemetic and other circuitry necessary to implement the polynomial hashing according to this invention. By way of example only, a suitable circuit configuration will be described with reference to the accompanying FIGURE.

Utilizing Horner's rule, the equation $$f_y(x)=y^0x_1+y^1x_2+\ldots+xy^{n-1}x_n$$

can be rewritten as $$f_y(x) = x_1 + y(x_2 + y(x_3 + \ldots y(x_n))\ldots).$$

The rewriting of the formula for the hashing function $f_y(x)$ expresses $f_y(x)$ in terms of alternating additions of $x_i$ and multiplications by y, thereby obviating the requirement of separately calculating powers of y, and consequently reducing the number of multiplications required in the calculation.

The hardware necessary to implement the hashing can then be as illustrated in the FIGURE. The sequence of operations performed by the arrangement illustrated in the accompanying FIGURE can be defined by the following sequence of operations $$t_1 = x_n$$

$$t_i = x_{n-i+1} + y(t_{i-1}),$$

i=2, ... n $$f_y(x) = t_n.$$

The arrangement shown in the FIGURE includes first and second accumulators 10 and 12, an adder 14 and a multiplier 16. The system would operate with a two-phase clock (not shown). In the first clock phase, the contents of accumulator 10 will be added to $x_i$ in the adder 14, with the addition result being loaded into the accumulator 12. In the second clock phase, the contents of the accumulator 12 will be multiplied by the value of y in the multiplier 16, and the multiplication result loaded into the accumulator 10. To be consistent with the above examples, the values of $x_i$ would be provided to the adder 14 in reverse order, i.e., commencing with $x_n$ and ending with $x_1$, although it should be appreciated that the numbering of individual substrings is arbitrary and that the substrings $x_i$ could therefore be provided to the adder 14 in any order as long as consistency is maintained.

In any event, the cycling of the hardware through consecutive clock cycles would continue until the last value of $x_i$ is added in the adder 14, at which point the contents of the accumulator 12 will represent $f_y(x)$.

Reference numeral 18 in the FIGURE generally designates a source of y values. This could be implemented in a variety of ways using appropriate hardware or software, or it could even be accomplished by manual selection.

If a single-stage hashing function is to be used according to the first embodiment of the invention described above, the adder 14 and multiplier 16 will be modulo b devices, where b is a prime number defining the size of the range B into which the elements x are to be mapped. The output of the adder 14 will then constitute the hashing function output. If a two-stage hashing process is to be implemented according to the second embodiment of this invention, the adder 14 and multiplier 16 will be modulo p devices where p is some larger prime number, and the fy(x) output of the accumulator 12 will be provided to a $g_z$ function circuit for calculation of the value $g_z(f_y(x))$ in a known manner.

The use of the hashing function output in different applications will be obvious to the ordinarily skilled artisan. For example, when the polynomial hashing of this invention is used for purposes of data storage and retrieval in which elements x from a large data base are to be stored in a smaller memory, the data to be stored could be provided to a memory together with the hashed address. The hashed address could be provided directly from the output of the accumulator 12, or from the output of the $g_z$ function circuit in the case of the second embodiment of this invention.

For error detection applications, the data could be transmitted together with the corresponding hash function output, with the hash function being recalculated at the receiving end and compared with the received hash function value to determine if the received data is accurate.

The use of the hashing technique according to the present invention in the context of authentication tags could be implemented in a manner similar to that for error detection described above. In general, however, authentication tag techniques would be more complex in that it would be desirable to change hashing functions after each message for security purposes, and it would be desirable to generate a single hash value from an entire message rather than separately hashing successive parts of a message. A more detailed description of authentication tag requirements is given in our above-cited paper entitled "New Hash Functions and Their Use in Authentication and Set Equality".

We claim:

1. A method of compressing an input data word x into a first output data word form a set of b possible output data words, b being of the form $p^k$ where p is a prime number and k is a positive integer, said method comprising the steps of:

separating said input data word x into n portions $x_1$ through $x_n$;

selecting an element y from a finite field of b elements; and generating said first output data word according to $f_y(x) = y^0 x_1 + y^1 x_2 + \ldots + y^{n-1} x_n$, where the addition and multiplication operations are those of said finite field of b elements.

2. A method as defined in claim 1, wherein said generating step further comprises the steps of providing a set of b different values for said integer y, and selecting one of said different values for use in calculating $f_y(x)$.

3. A method as defined in claim 1, wherein said generating step comprises generating said first output data word according to the following formulae:

$$t_1 = x_n$$

$$t_i = x_{n-i+1} + y(t_{i-1}),$$

for i=2, ... n $$f_y(x) = t_n$$

4. A method as defined in claim 1, wherein k=1 and said generating step comprises generating said first output data word according to $f_y(x) = (y^0 x_1 + y^1 x_2 + \ldots + y^{n-1} x_n) \pmod{b}$.

5. A method as defined in claim 1, wherein said first input data word x is a multi-bit data word, and said separating step comprises separating said multi-bit data word into a plurality of portions each having no more than a predetermined number of bits.

6. A method as defined in claim 5, wherein said predetermined number of bits is $\log_2(b)$.

7. A method as defined in claim 1, wherein said first input data word x is a multi-digit data word, and said separating step comprises separating said multi-digit data word into a plurality of portions each having no more than a predetermined number of digits.

8. A method as defined in claim 5, wherein said predetermined number of digits is $\log_r(b)$, where r represents the radix in which said data word x is represented.

9. A method of compressing an input data word into an output data word from a set of b possible output data words, where b is an integer, said method comprising the steps of:

separating said first input data word x into n portions $x_1$ through $x_n$; and generating said first output data word according to $f_y(x) = y^0 x_1 + y^1 x_2 + \ldots + y^{n-1} x_n$ (mod b), where y is an integer.

10. A method as defined in claim 9, wherein $0 \leq y \leq b$.

11. A method as defined in claim 9, wherein said generating step comprises generating said first output data word according to the following formulae:

$$t_1 = x_n$$

$$t_i = x_{n-i+1} + y(t_{i-1}),$$

for $i = 2, \ldots n$ $$f_y(x) = t_n$$

12. A method as defined in claim 9, wherein said generating step further comprises the steps of providing a set of b different values for said integer y, and selecting one of said different values for use in calculating $f_y(x)$.

13. A method as defined in claim 9, wherein b is a prime number.

14. A method as defined in claim 9, wherein said input data word x is a multi-bit data word, and said separating step comprises separating said multi-bit data word into a plurality of portions each having no more than a predetermined number of bits.

15. A method as defined in claim 14, wherein said predetermined number of bits is no greater than $\log_2(b)$.

16. A method as defined in claim 9, wherein said input data word x is a multi-digit data word, and said separating step comprises separating said multi-digit data word into a plurality of portions each having no more than a predetermined number of digits.

17. A method as defined in claim 16, wherein said predetermined number of digits is no greater than $\log_r(b)$, where r represents the radix in which said data word x is represented.

18. A method as defined in claim 9, wherein said method further comprises the step of generating a second output data word according to $g_z(f_y(x))$, where $g_z$ is a hash function.

19. A method of communicating a data message M, said data message M including a plurality of bits, said method comprising the steps of:

separating said message M into a plurality of portions $x_1$ through $x_n$, where n is an integer; and generating an authentication tag T for transmission with said message M, said authentication tag T being generated according to $f_y(x) = (y^0 x_1 + y^1 x_2 + \ldots + y^{n-1} x_n)$ (mod b), where y is an integer;

transmitting said message M and authentication tag T.

20. A method as defined in claim 19, wherein said message M and authentication tag T are transmitted to a receiving end, said method further comprising, at said receiving end, the steps of:

receiving said message M and authentication tag T;

separating said received message M into a plurality of portions $x'_1$ through $x'_n$;

generating a receiving end authentication tag T' according to $f_y(x) = (y^0 x'_1 + y^1 x'_2 + \ldots + y^{n-1} x'_n)$ (mod b), where y is said integer; and comparing said authentication tag T' with said received authentication tag T to authenticate said received message M.

21. A method of storing data in a data processing system, said method including the steps of generating an address for each data word to be stored and storing each said data word at its respective generated address in a memory having at least b storage locations, said system being of the type wherein a first data word is represented by a multi-bit element x, said method comprising:

separating said element x into n portions $x_1$ through $x_n$;

generating a storage address in accordance with $f_y(x) = (y^0 x_1 + y^1 x_2 + \ldots + y^{n-1} x_n)$ (mod b), where y is an integer; and storing said first data word at said storage address.

22. A method as defined in claim 1, wherein said data word x belongs to a set of a input data words, and a is greater than b.

23. A method as defined in claim 9, wherein said input data word belongs to a set of a input data words, and a is greater than b.

* * * * *